Jan. 3, 1950     G. T. GRIGG     2,493,452
PIPE JOINT
Filed May 24, 1947
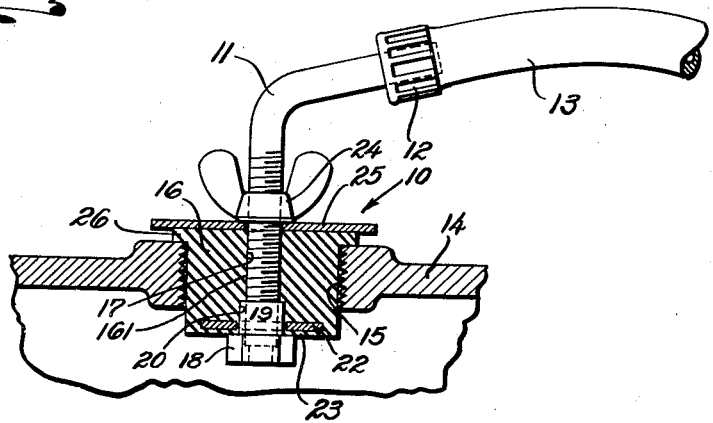
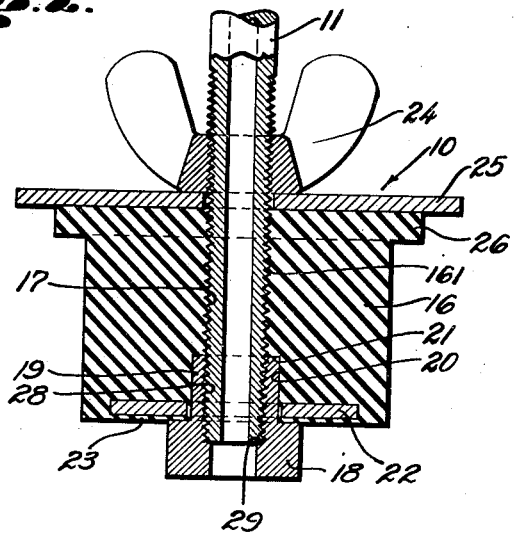
GEORGE T. GRIGG
INVENTOR.
BY *H. Calvin White*
ATTORNEY Patented Jan. 3, 1950

2,493,452

UNITED STATES PATENT OFFICE 2,493,452

PIPE JOINT

George T. Grigg, Walnut Park, Calif.

Application May 24, 1947, Serial No. 750,277

9 Claims. (Cl. 285—165)

1

This invention has for its general object to provide an improved form of connection for use in hydraulic brake servicing equipment, and particularly for effecting a fluidtight connection between a service unit fluid discharge line or hose, and the filling opening in a body, such as the master cylinder body, through which fluid is taken into the brake system.

Particularly the invention aims to provide a plug-type connection receivable within the filling opening, and capable of simple manipulation to assure a fluidtight seal between the wall of the opening and the filling line. Generally contemplated is a fitting comprising a rubber plug through which a tubular filling stem extends, and adjustable means for radially expanding the plug within the receiving opening to effect fluidtight seals against both the wall of the opening and the filling stem.

In its more specific aspects the invention contemplates a sealing connection in the form of a rubber plug receiving a threaded filling stem carrying at the outside of the plug a nut adjustable to produce axial compression and therefore radial expansion of the plug. Preferably the tightening force of the nut acts to axially compress the plug between a pair of washers, the inner end of which is vulcanized to the plug. In order to adapt the filling stem for use with different size plugs, the inner end of the stem may carry a nut removable for replacement of the plugs. As will appear, a specific feature is the accommodation of the inner nut within the plug so that it serves both to apply axial compression to the plug and engage the rubber to effect a fluidtight seal about the filling stem.

The above mentioned features of the invention, as well as additional objects and details, will be understood to better advantage from the following detailed description of the preferred embodiment shown by the accompanying drawing, in which:

Fig. 1 is a sectional view showing the service hose fitting inserted within the filling opening of the master cylinder body; and Fig. 2 is an enlarged cross-sectional view of the fitting.

In the drawings, the fitting, generally indicated at 10, is shown to be carried by the tubular stem 11 attached at 12 to hose 13 through which fluids such as air, cleansing liquid and hydraulic brake liquid, are dispensed from appropriate service equipment, not shown. The fluids are charged into a suitable location in the hydraulic

2 brake system, such as the master cylinder body 14 containing the normally plugged, threaded opening 15.

The fitting 10 comprises a rubber plug 16 having an external diameter corresponding closely to the diameter of opening 15, the plug being carried by stem 11 in a manner permitting its replacement by different diameter plugs to adapt the single fitting for reception within the varying size openings 15 of different hydraulic brake systems. The tubular stem 11 is externally threaded at 161 and extends through an axial opening or bore 17 in the plug. The inner end of the stem carries a nut 18 having a reduced diameter portion 19 received within the plug counterbore 20 and engageable against shoulder 21.

As will appear, nut 18 exerts against the plug an axial pressure which is applied to a metallic washer 22 preferably integrated, as by vulcanization, with the plug. As illustrated in Fig. 2, washer 22 may be imbedded in the plug, and thinly covered by the rubber at 23. At the outside of the plug, stem 11 carries a wing nut 24 engageable against a metallic washer 25 applied to but preferably otherwise unattached to the plug. In use, the fitting is applied to the body 14 by insertion of the plug 16 into opening 15 with nut 24 loosened sufficiently to permit assumption by the plug of its normal diameter. Positioning of the plug within the opening is determined by engagement of the rubber flange 26 with the face of body 14 about its opening. Nut 24 then is tightened against washer 25, causing nut 18 to be pulled against the plug, thus subjecting it to axial compression to a degree resulting in radial expansion of the plug into fluidtight engagement with the body 14, the fluid seal being aided by expansion of the rubber at the inside of opening 15, and the overhang of flange 26 at the outside. An effective fluid seal is also created between stem 11 and the plug body by reason of constructive displacement against the stem of the rubber as it is axially compressed, and particularly by reason of the reduced portion 19 of nut 18 being pressed and maintained in sealing engagement against the internal plug shoulder 21.

A seal also is maintained to prevent fluid leakage from the container between the stem and the threads of the inner nut 18. It will be noted that only the counterbore 28 of the nut is threaded, so that beyond the threads is formed an annular shoulder engageable against the end of the stem 11. When the connector is assembled, nut 18 is taken up with sufficient tightness that the engagement of shoulder 29 against the stem end forms a seal preventing fluid escape between the threads. As previously indicated, the same tightening of the nut engages it against the plug shoulder 21 to preclude leakage within the stem threads beyond the nut.

I claim:

1. A fitting for reception within an opening in a fluid receiving body of a hydraulic brake system, comprising a rubber plug receivable within said opening, a threaded stem for connection with a hose to pass fluid into said body, said stem extending axially within and projecting from the outside of the plug, metallic washers about the stem at the inner and outer ends of the plug, said inner washer being embedded within said plug and vulcanized therein, and a nut on said stem adapted to be tightened against said outer washer to axially compress and consequently radially expand the plug within said opening.

2. A fitting for reception within an opening in a fluid receiving body of a hydraulic brake system, comprising a rubber plug receivable within said opening, a threaded stem for connection with a hose to pass fluid into said body, said stem extending axially within and projecting from the outside of the plug, metallic washers about the stem at the inner and outer ends of the plug, a nut threaded on the inner end of the stem and having a reduced portion fitting within a counterbore in said plug, and a second nut on the outer end of said stem adapted to be tightened against said outer washer to axially compress and consequently radially expand the plug against the walls of said opening and against the stem and the outer surface of said reduced portion of the inner nut.

3. A fitting for reception within an opening in a fluid receiving body of a hydraulic brake system, comprising a rubber plug receivable within said opening, a threaded stem for connection with a hose and received within an opening extending axially through the plug, a nut threaded on the inner end of the stem and having a reduced portion fitting within a counterbore in said plug, the enlarged portion of the nut presenting a substantially transverse annular shoulder to bear against the inner end of said plug and the reduced portion of the nut presenting a shoulder to bear against a mating shoulder at the end of the counterbore, a second nut threaded on said stem at the outside of the plug and adapted to be tightened against the plug to subject it to axial compression between the nuts and radial expansion within said opening, said axial compression causing said inner nut shoulders to tightly engage the plug and thereby maintain a double fluid seal.

4. A fitting for reception within an opening in a fluid receiving body of a hydraulic brake system, comprising a rubber plug receivable within said opening, a threaded stem for connection with a hose and received within an opening extending axially through the plug, a pair of metallic washers surrounding the stem and vulcanized to the inner and outer ends of the plug, a nut threaded on the inner end of the stem to exert pressure against the inner washer, and a second nut threaded on the stem at the outside of the plug and adapted to be tightened against the outer washer to subject the plug to axial compression and radial expansion within said opening.

5. A fitting for reception within an opening in a fluid receiving body of a hydraulic brake system, comprising a rubber plug receivable within said opening, a threaded stem for connection with a hose and received within an opening extending axially through the plug, a pair of metallic washers surrounding the stem at the inner and outer ends of the plug, a nut on the inner end of said stem and projecting through the inner washer within a counterbore in the plug, and a second nut threaded on the stem at the outside of the plug and adapted to be tightened against the outer washer to subject the plug to axial compression and radial expansion and to bring the inner nut into fluid tight engagement with an internal plug shoulder at the end of said counterbore.

6. A fitting for reception within an opening in a fluid receiving body of a hydraulic brake system, comprising a rubber plug receivable within said opening, a threaded stem for connection with a hose to pass fluid into said body, said stem extending axially within and projecting from the outside of the plug, metallic washers about the stem at the inner and outer ends of the plug, a nut on said stem at the outside of the plug and adapted to be tightened against said outer washer to axially compress and consequently radially expand the plug within said opening, and a rubber flange on the outer end of said plug engageable with the outer face of the body about said opening, to form a fluid seal in response to tightening of said nut.

7. A fitting for reception within an opening in a fluid receiving body of a hydraulic brake system comprising a rubber plug receivable within said opening, a threaded stem for connection with a hose and received within an opening extending axially through the plug, a pair of metallic washers surrounding the stem at the inner and outer ends of the plug, a nut on the inner end of said stem and projecting through the inner washer within a counterbore in the plug, a second nut threaded on the stem at the outside of the plug and adapted to be tightened against the outer washer to subject the plug to axial compression and radial expansion and to bring the inner nut into fluid tight engagement with an internal plug shoulder at the end of said counterbore, and a rubber flange on the outer end of said plug engageable with the outer face of the body about said opening to form a fluid seal in response to tightening of said second nut.

8. A fitting for reception within an opening in a fluid receiving body of a hydraulic brake system, comprising a rubber plug receivable within said opening, a threaded stem for connection with a hose and received within an opening extending axially through the plug, a nut threaded on the inner end of the stem and bearing against the plug, and a second nut threaded on said stem at the outside of the plug and adapted to be tightened against the plug to subject it to axial compression between the nuts and radial expansion within said opening, the first mentioned nut having a shoulder bearing against the stem to form a tight seal preventing fluid leakage through the engaged stem and nut threads.

9. A fitting for reception with an opening in a fluid receiving body of a hydraulic brake system, comprising a rubber plug receivable with said opening, a threaded stem for connection with a hose and received within an opening extending axially through the plug, a pair of metallic washers surrounding the stem at the inner and outer ends of the plug, a nut on the inner end of said stem and projecting through the inner washer within a counterbore in the plug, and a second nut threaded on the stem at the outside of the plug and adapted to be tightened against the outer washer to subject the plug to axial compression and radial expansion and to bring the inner nut into fluid tight engagement with an internal plug shoulder at the end of said counterbore, the first mentioned nut having a shoulder bearing against the stem to form a tight seal preventing fluid leakage through the engaged stem and nut threads.

GEORGE T. GRIGG.

REFERENCES CITED

The following references are of record in the file of this patent:

UNITED STATES PATENTS

| Number | Name | Date |
| --- | --- | --- |
| 922,544 | Turner | May 25, 1909 |
| 966,748 | Honecker | Aug. 9, 1910 |
| 1,862,153 | Lee | June 7, 1932 |

FOREIGN PATENTS

| Number | Country | Date |
| --- | --- | --- |
| 512,256 | Great Britain | Aug. 31, 1939 |